US011221485B2

(12) United States Patent
Ma et al.

(10) Patent No.: US 11,221,485 B2
(45) Date of Patent: Jan. 11, 2022

(54) DYNAMICALLY CONTROLLED FOCAL PLANE FOR OPTICAL WAVEGUIDE-BASED DISPLAYS

(71) Applicant: Flex Ltd., Singapore (SG)

(72) Inventors: Jiayin Ma, Palo Alto, CA (US); Robert J. Groppo, Sunnyvale, CA (US)

(73) Assignee: Flex, Ltd., Singapore (SG)

( * ) Notice: Subject to any disclaimer, the term of this patent is extended or adjusted under 35 U.S.C. 154(b) by 0 days.

(21) Appl. No.: 16/692,529

(22) Filed: Nov. 22, 2019

(65) Prior Publication Data
US 2020/0166758 A1 May 28, 2020

Related U.S. Application Data

(63) Continuation of application No. 15/845,604, filed on Dec. 18, 2017, now abandoned.

(51) Int. Cl.
| | |
|---|---|
| *G02B 27/01* | (2006.01) |
| *F21V 8/00* | (2006.01) |
| *G02B 15/00* | (2006.01) |
| *H04N 9/31* | (2006.01) |

(Continued)

(52) U.S. Cl.
CPC ......... *G02B 27/0172* (2013.01); *G02B 6/003* (2013.01); *G02B 6/009* (2013.01); *G02B 6/0013* (2013.01); *G02B 6/0066* (2013.01); *G02B 15/00* (2013.01); *H04N 9/3185* (2013.01); *H04N 13/332* (2018.05); *H04N 13/383* (2018.05);

(Continued)

(58) Field of Classification Search
CPC .... G02B 27/0172; G02B 15/00; G02B 6/003; G02B 2027/014; G02B 2027/0134; H04N 13/332; H04N 13/383; H04N 9/3185
See application file for complete search history.

(56) References Cited

U.S. PATENT DOCUMENTS

| | | | | |
|---|---|---|---|---|
| 8,040,622 | B1 * | 10/2011 | Schuster | G02B 7/028 |
| | | | | 359/824 |
| 2004/0165284 | A1 * | 8/2004 | Holler | G02B 27/0172 |
| | | | | 359/805 |

(Continued)

OTHER PUBLICATIONS

Official Action for U.S. Appl. No. 15/845,604, dated Apr. 19, 2019, 22 pages.

(Continued)

*Primary Examiner* — Joseph Suh
(74) *Attorney, Agent, or Firm* — Sheridan Ross P.C.

(57) ABSTRACT

Embodiments provide systems and methods for providing a dynamically variable focal plane in a waveguide-based display. Generally speaking, embodiments described herein provide an optical system that allows variable control of the focal length of the image emerging from the display engine into the waveguide. This can be a dynamic system that is controlled based upon the content being projected on the display. For a stereoscopic system, individual control of each eye can be provided. More specifically, embodiments comprise an electrically tunable lens element interposed between the output of the projection engine and the optical waveguide and a control unit to dynamically the tunable lens element to vary the focal length of the images provided to the waveguide display.

18 Claims, 6 Drawing Sheets

(51) Int. Cl.
*H04N 13/332* (2018.01)
*H04N 13/383* (2018.01)

(52) U.S. Cl.
CPC ............... *G02B 2027/014* (2013.01); *G02B 2027/0134* (2013.01)

(56) References Cited

U.S. PATENT DOCUMENTS

| | | | | |
|---|---|---|---|---|
| 2014/0043701 | A1* | 2/2014 | Motomura | B41J 2/14 359/811 |
| 2014/0071539 | A1* | 3/2014 | Gao | G02B 27/0172 359/630 |
| 2015/0309316 | A1* | 10/2015 | Osterhout | G06F 1/163 345/8 |
| 2016/0344981 | A1* | 11/2016 | Lunt | G06K 9/0063 |
| 2017/0068111 | A1* | 3/2017 | Kyung | G02F 1/29 |
| 2017/0115490 | A1* | 4/2017 | Hsieh | G02B 27/0068 |
| 2017/0299867 | A1* | 10/2017 | Tsai | G02B 6/0005 |
| 2017/0307893 | A1* | 10/2017 | Kooi | G02B 27/0179 |
| 2017/0336638 | A1* | 11/2017 | Bos | G02B 27/0172 |
| 2018/0270404 | A1* | 9/2018 | Ishida | H01L 27/14632 |
| 2018/0284464 | A1* | 10/2018 | Lu | G02B 27/14 |
| 2019/0187471 | A1 | 6/2019 | Ma et al. | |

OTHER PUBLICATIONS

Final Action for U.S. Appl. No. 15/845,604, dated Aug. 28, 2019, 23 pages.

* cited by examiner

DYNAMICALLY CONTROLLED FOCAL PLANE FOR OPTICAL WAVEGUIDE-BASED DISPLAYS

CROSS REFERENCE TO RELATED APPLICATION

The present application is a continuation of and claims priority to U.S. patent application Ser. No. 15/845,604, filed Dec. 18, 2017, entitled "DYNAMICALLY CONTROLLED FOCAL PLANE FOR OPTICAL WAVEGUIDE-BASED DISPLAYS", which is incorporated herein by reference in its entirety for all that it teaches and for all purposes.

FIELD OF THE DISCLOSURE

Embodiments of the present disclosure relate generally to methods and systems for display devices and methods and more particularly to augmented reality and mixed reality waveguide-based display devices and methods providing a dynamically variable focal plane.

BACKGROUND

The optical waveguide has become a common element in heads up displays used in Augmented Reality (AR) and Mixed Reality (MR) devices. As the waveguide technology matures it is likely to also play a role in Virtual Reality (VR) devices. Such displays are commonly referred to as a Near-Eye Display (NED). In these systems, there are two major components: a projection engine which renders either a raster or vector based mono or full color image into a small aperture; and a waveguide that takes that image from the display engine and projects it across a larger surface which faces the user's eye. In AR and MR applications, the waveguide forms a lens that can display both the image generated by the projection image as well as allow users view of the real world. These displays can be either monoscopic or stereoscopic.

In current waveguide-based NEDs, there are two major limitations. The first limitation is that the virtual image displayed by the waveguide has a fixed focal length with images on the display typically appearing to the user as a large flat display suspended in one fixed space location approximately between 0.5 meters to 10 meters in front of the user. While this may be suitable for some content, e.g., documents for reading, a fixed focal plane is problematic for more detailed graphical structures designed to reside in the augmented reality space—either in the near field or far field. Directly related to this is a second issue whereby the image may not be in focus to people with vision impairment such as near or far sightedness. The first problem is more relevant in augmented reality whereby the user is attempting to bring into view objects at varying distances in the real-world combined with computer-generated objects overlaid onto this real-world view. The second problem occurs when a far-sighted user is presented with detail images 0.5 meters away. Typically to solve this problem, the user is required to wear prescription lenses along with the AR device which can be cumbersome and present other negative optical issues such as glare, reflection, color aberrations, tilt, etc. Hence, there is a need for improved methods and systems for providing a dynamically variable focal plane in a waveguide-based display.

BRIEF SUMMARY

Embodiments of the disclosure provide systems and methods for providing a dynamically variable focal plane in a waveguide-based display. Generally speaking, embodiments described herein provide an optical system that allows variable control of the focal length of the image emerging from the display engine into the waveguide. This can be a dynamic system that is controlled based upon the content being projected on the display. For a stereoscopic system, individual control of each eye can be provided. More specifically, embodiments comprise an electrically tunable lens element interposed between the output of the projection engine and the optical waveguide and a control unit to dynamically sweep the tunable lens element across the focal length range of the images provided to the waveguide display.

According to one embodiment, a display device comprises a projection display engine generating and projecting the images and a waveguide display element guiding the generated images from the projection display engine and delivering the received images between the surfaces of the waveguide display element to create the virtual images to a user of the display device. A variable lens element can be placed between the waveguide display element and the projection display engine. The variable lens element can also be adapted to adjust a focal plane of the images rendered on the surface of the waveguide display element visible to a user. An electronic control unit can be electronically coupled with the variable lens element and adapted to control adjustment of the focal plane of the images rendered on the surface of the waveguide display element visible to a user.

For example, adjustment of the focal plane of the images rendered can comprise a static adjustment based on a user input. Additionally or alternatively, adjustment of the focal plane of the images rendered can comprise a dynamic adjustment based on a content of the images rendered on the surface of the waveguide display element visible to the user or feedback from eye tracking sensors. In some cases, the waveguide display element can comprise a stereoscopic display. In such cases, the variable lens element can independently adjust the focal plane of images rendered for each eye of the user. A projection display engine focusing lens can be disposed adjacent to the projection display engine. In such cases, the variable lens element can be disposed between the waveguide display element and the projection display engine focusing lens. In other cases, the variable lens element can be disposed adjacent to both the waveguide display element and the projection display engine.

The display device can further comprise an eye tracking system. In such cases, the electronic control unit can receive eye tracking data or instructions from the eye tracking system and controls the variable lens element to adjust the focal plane of the images rendered on the surface of the waveguide display element visible to the user based on the received eye tracking data or instructions.

Additionally or alternatively, the display device can further comprise an Inertial Measurement Unit (IMU). The electronic control unit can receive information or instructions from the IMU indicating a movement of the user. The electronic control unit can control the variable lens element to adjust a level of zoom and the focal plane of the images rendered on the surface of the waveguide display element visible to the user based on the received information or instructions from the IMU indicating a movement of the user.

In some cases, the variable lens element of the display device can additionally or alternatively comprise a deformable lens having three or more control locations. In such cases, the electronic control unit can maintain a predefined set of control parameters. The electronic control unit can cause the variable lens element to apply a nonuniform force to the deformable lens through the three or more control locations based on the set of control parameters causing the deformable lens to compensate for assembly pitch and yaw misalignments of the variable lens element.

Additionally or alternatively, the display device can further comprise one or more temperature sensors and the electronic control unit can maintain a predefined set of temperature correction curves for one or more of the projection display engine, variable lens element, or waveguide display element over a range of operating conditions. The electronic control unit can then receive electronic input from the one or more temperature sensors and apply one or more temperature correction curves of set of temperature correction curves to a lens control function. The lens control function can in turn adjust the variable lens element and compensate for a temperature indicated by the received electronic input from the one or more temperature sensors based on the applied one or more temperature correction curves.

According to another embodiment, a control system of a display device can comprise a processor and a memory coupled with and readable by the processor. The memory can store therein a set of instructions which, when executed by the processor, causes the processor to control a variable lens element of the display device disposed between a waveguide display element of the display device and a projection display engine of the display device. The processor of the control system can control the variable lens element by receiving one or more images generated by the projection display engine and rendered by the waveguide display element on a surface of the waveguide display element visible to a user of the display device. The processor of the control systems can determine a focal plane for the images rendered on the surface of the waveguide display element visible to the user of the display device based at least in part on content of the received one or more images and control the variable lens element to adjust rendering of the images on the surface of the waveguide display element visible to the user of the display device based on the determined focal plane.

According to yet another embodiment, a method for controlling a display device can comprise receiving, by a control unit of the display device, one or more images generated by a projection display engine of the display device and rendered by a waveguide display element of the display device on a surface of the waveguide display element visible to a user of the display device. A focal plane for the images rendered on the surface of the waveguide display element visible to the user of the display device can be determined by the control unit of the display device based at least in part on content of the received one or more images. A variable lens element of the display device can be controlled by the control unit of the display device. The variable lens element can be disposed between the projection display device and the waveguide display element and the variable lens element can adjust rendering of the images on the surface of the waveguide display element visible to the user of the display device based on the determined focal plane.

The display device can further comprise an eye tracking system. In such cases, controlling the variable lens element can further comprise receiving eye tracking data or instructions from the eye tracking system and adjusting the focal plane of the images rendered on the surface of the waveguide display element visible to the user based on the received eye tracking data or instructions.

Additionally or alternatively, the display device can further comprise an Inertial Measurement Unit (IMU). In such cases, controlling the variable lens element can further comprise receiving information or instructions from the IMU indicating a movement of the user and controlling the variable lens element to adjust a level of zoom and the focal plane of the images rendered on the surface of the waveguide display element visible to the user based on the received information or instructions from the IMU indicating a movement of the user.

The variable lens element can additionally or alternatively comprise a deformable lens having three or more control locations. In such cases, controlling the variable lens element can further comprise maintaining a predefined set of control parameters, and causing the variable lens element to apply a nonuniform force to the deformable lens through the three or more control locations based on the set of control parameters causing the deformable lens to compensate for assembly pitch and yaw misalignments of the variable lens element.

Additionally or alternatively, the display device can further comprise one or more temperature sensors and the electronic control unit can maintain a predefined set of temperature correction curves for one or more of the projection display engine, variable lens element, or waveguide display element over a range of operating conditions. In such cases, controlling the variable lens element can further comprise receiving electronic input from the one or more temperature sensors and applying one or more temperature correction curves of set of temperature correction curves to a lens control function, the lens control function adjusting the variable lens element and compensating for a temperature indicated by the received electronic input from the one or more temperature sensors based on the applied one or more temperature correction curves.

Figure 1:
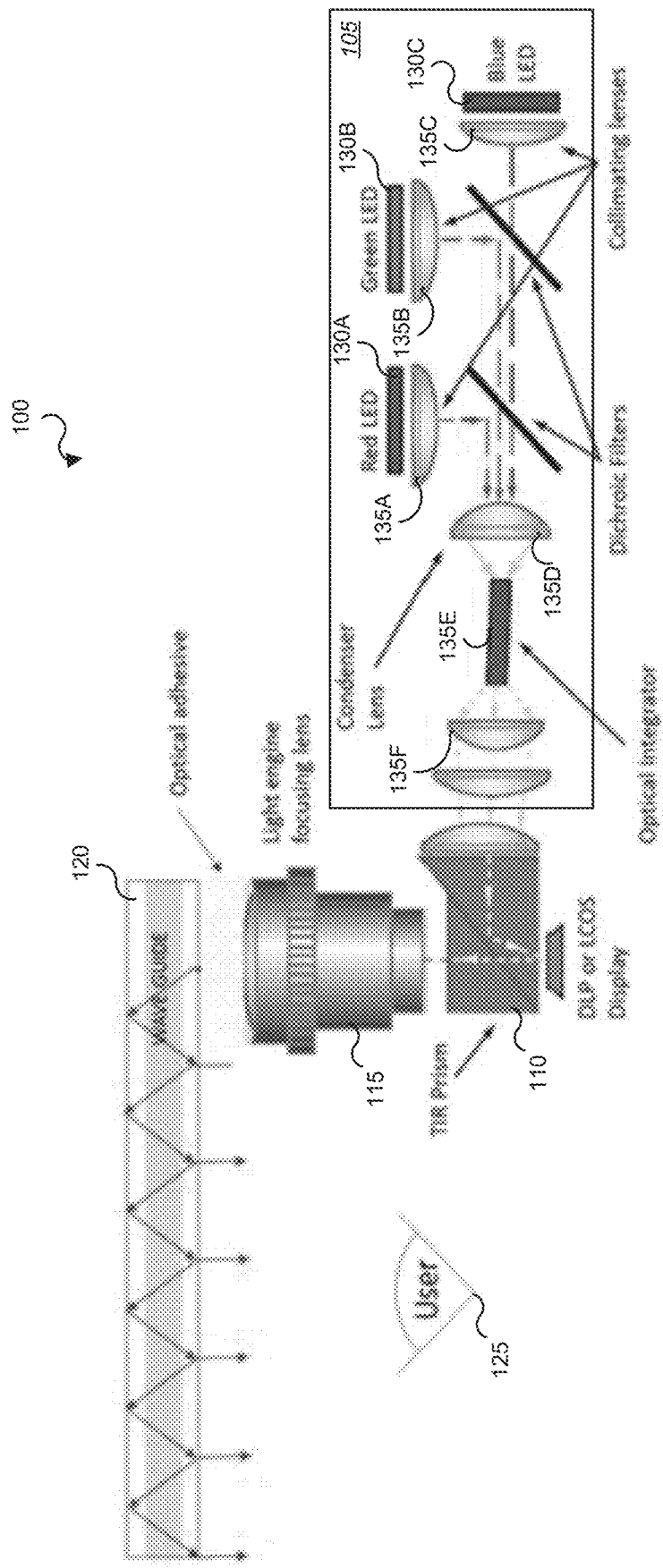
FIG. 1 is a diagram illustrating elements of an optical waveguide imaging system.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for providing a dynamically variable focal plane in a waveguide-based display. Generally speaking, embodiments described herein provide an optical system that allows variable control of the focal length of the image emerging from the display engine into the waveguide. This can be a dynamic system that is controlled based upon the content being projected on the display. For a stereoscopic system, individual control of each eye can be provided. More specifically, embodiments comprise an electrically tunable lens element interposed between the output of the projection engine and the optical waveguide and a control unit to dynamically the tunable lens element to vary the focal length of the images provided to the waveguide display.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a diagram illustrating elements of an optical waveguide imaging system. As illustrated in this example, the imaging system 100 or display device can comprise a projection display engine 105, prism 110, lens 115, and waveguide display 120. As known in the art, the projection engine 105 can comprise one or more light sources 130A-130C and integrating optical elements 135A-135F. The prism 110 can comprise a reflective display such as Digital Light Processing (DLP) or Liquid Crystal on Silicon (LCOS) reflecting images generated by the light sources 130A-130C and optical elements 135A-135F of the projection engine 105 into the lens 115 of the display device. The lens 115 can comprise a standard output lens coupling the projection engine 105 to the waveguide display 120. Alternatively, the projection engine 105 could use an emissive display such as an Organic Light Emitting Diode (OLED or uOLED) or Liquid Crystal Display (LCD) to substitute for the reflective display.

In either case, the image projected through the lens 115 to the waveguide display 120 can then be displayed on a surface of the waveguide display 120 visible to a user 125 wearing the display device, e.g., as an Augmented Reality (AR) or Mixed Reality (MR) headset or goggles, etc. As known in the art, the waveguide display 120 can be transparent allowing the user to see both the real world as well as the AR or MR components generated and projected by the projection engine 105, prism 110, and lens 115 and overlaid onto the real world by the waveguide display 120. The AR or MR images or components can be displayed in a focal plane having a predetermined focal length from the user 125. As will be described in detail below, embodiments provide for adjusting this focal length to vary the focal plane, e.g., based on the content being displayed or to adjust for the vision of the user.

Figure 2:
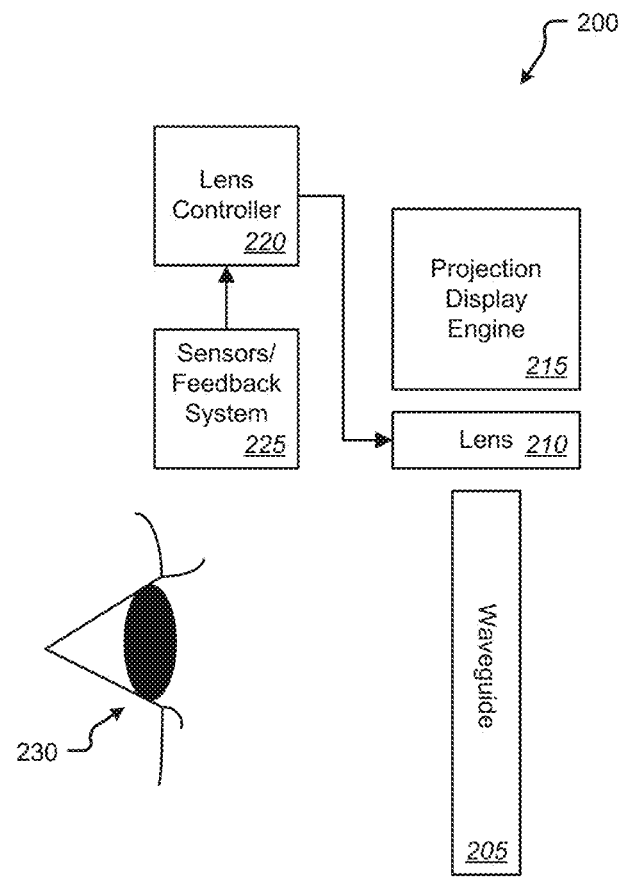
FIG. 2 is a block diagram illustrating elements of an optical waveguide imaging system providing a dynamically variable image focal length according to one embodiment of the present disclosure.

FIG. 2 is a block diagram illustrating elements of an optical waveguide imaging system providing a dynamically variable image focal length according to one embodiment of the present disclosure. As illustrated in this example, the system 200 can comprise a projection display engine 210 generating images and a waveguide display element 205 receiving the generated images from the projection display engine and rendering the received images on a surface of the waveguide display element 205 visible to an eye 230 of a user of the display device. A variable lens element 210 can disposed between the waveguide display element 205 and the projection display engine 215. The variable lens element 210 can adapted to adjust a focal plane of the images rendered on the surface of the waveguide display element 205 visible to a user. An electronic control unit 220 can be electronically coupled with the variable lens element 210 and adapted to control adjustment of the focal plane of the images rendered on the surface of the waveguide display element 205 visible to a user.

For example, adjustment of the focal plane of the images rendered can comprise a static adjustment based on a user input. Additionally, or alternatively, adjustment of the focal plane of the images rendered can comprise a dynamic adjustment based on a content of the images rendered on the surface of the waveguide display element 205 visible to the user. In some cases, the waveguide display element 205 can comprise a stereoscopic display. In such cases, the variable lens element 210 can independently adjust the focal plane of images rendered for each eye 230 of the user. A projection display engine focusing lens (not shown here) can be disposed adjacent to the projection display engine 215. In such cases, the variable lens element 210 can be disposed between the waveguide display element 205 and the projection display engine focusing lens (not shown here). In other cases, the variable lens element 210 can be disposed adjacent to both the waveguide display element 205 and the projection display engine 215.

In some cases, the variable lens element 210 can comprise a deformable lens having three or more control locations. In such cases, the electronic control unit 220 can maintain a predefined set of control parameters. The electronic control unit 220 can cause the variable lens element to apply a nonuniform force to the deformable lens through the three or more control locations based on the set of control parameters causing the deformable lens to compensate for assembly pitch and yaw misalignments of the variable lens element 210.

The system 200 can further comprise one or more sensors and/or feedback systems 225. For example, the sensors and/or feedback systems 225 can comprise an eye tracking system. In such cases, the electronic control unit 220 can receive eye tracking data or instructions from the eye tracking system and control the variable lens element 210 to adjust the focal plane of the images rendered on the surface of the waveguide display element 205 visible to the user based on the received eye tracking data or instructions.

In another example, the sensors and/or feedback systems 225 can comprise an Inertial Measurement Unit (IMU). The electronic control unit 220 can receive information or instructions from the IMU indicating a movement of the user. The electronic control unit 220 can control the variable lens element 210 to adjust a level of zoom and the focal plane of the images rendered on the surface of the waveguide display element 205 visible to the user based on the received information or instructions from the IMU indicating a movement of the user.

In yet another example, the sensors and/or feedback systems 225 can comprise one or more temperature sensors and the electronic control unit 220 can maintain a predefined set of temperature correction curves for one or more of the projection display engine 215, variable lens element 210, or waveguide display element 205 over a range of operating conditions. The electronic control unit 220 can then receive electronic input from the one or more temperature sensors and apply one or more temperature correction curves of set of temperature correction curves to a lens control function. The lens control function can in turn adjust the variable lens element 210 and compensate for a temperature indicated by the received electronic input from the one or more temperature sensors based on the applied one or more temperature correction curves.

Figure 3:
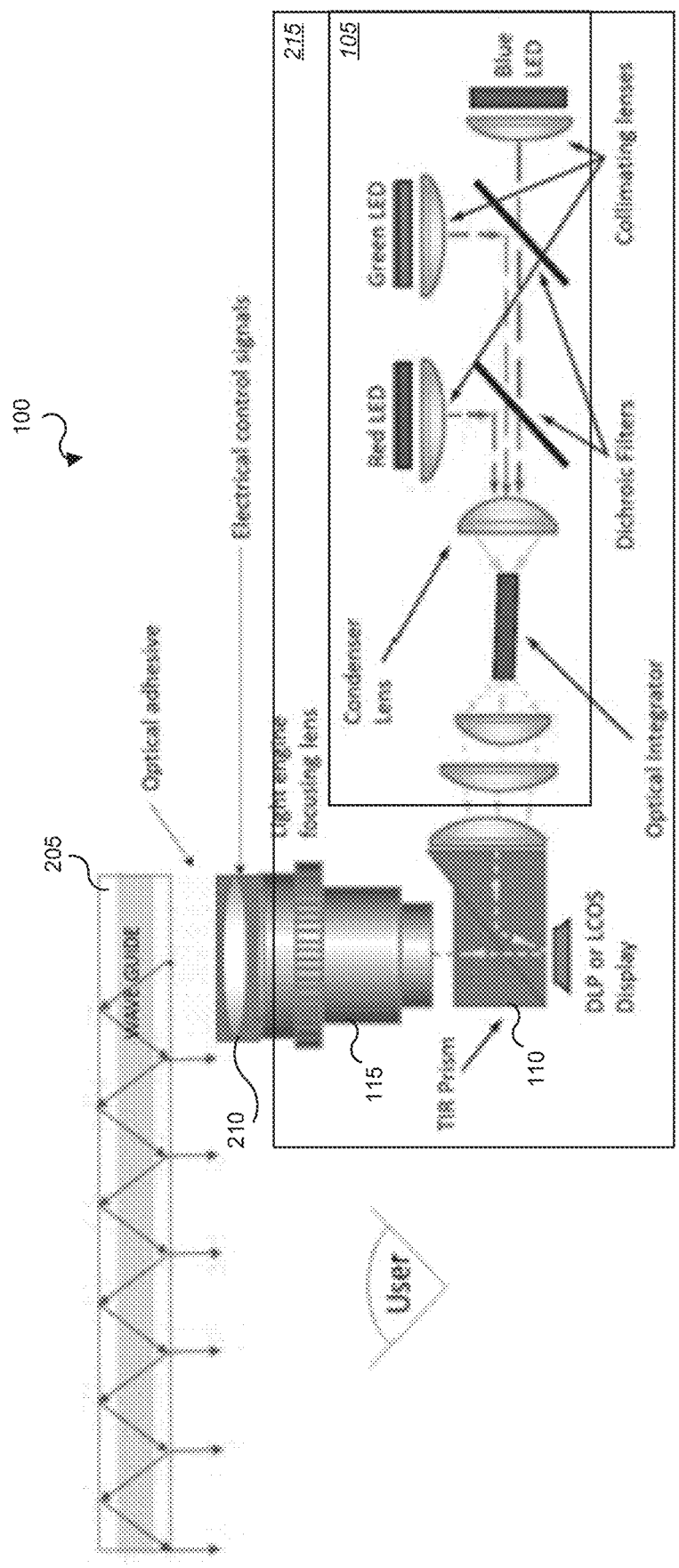
FIG. 3 is a diagram illustrating additional details of an optical waveguide imaging system providing a dynamically variable image focal length according to one embodiment of the present disclosure.

FIG. 3 is a diagram illustrating additional details of an optical waveguide imaging system providing a dynamically variable image focal length according to one embodiment of the present disclosure. As illustrated in this example, the imaging system 200 or display device can comprise a projection display engine 215, variable lens 210, and waveguide display 205 as described above with reference to FIG. 2. The projection display engine 215 as shown here can comprise any number of elements to generate images and, as shown here, can include a projection engine 105, prism 110, and lens 115 as described above with reference to FIG. 1.

As introduced above, the variable lens 210 provides an optical system that allows control of the focal length of the image emerging from the projection display engine 215 into the waveguide display 205. According to the embodiment illustrated here, the variable lens 210 can comprise an electrically tunable lens element has been added between the output of the projection display engine 215 and the waveguide display 205. This can be a static system whereby the user has a knob, buttons, sliders, or other input devices to adjust the focal length or it can be a dynamic system that is controlled based upon the content being projected on the display. For a stereoscopic system, individual control of each eye can be provided.

Figure 4:
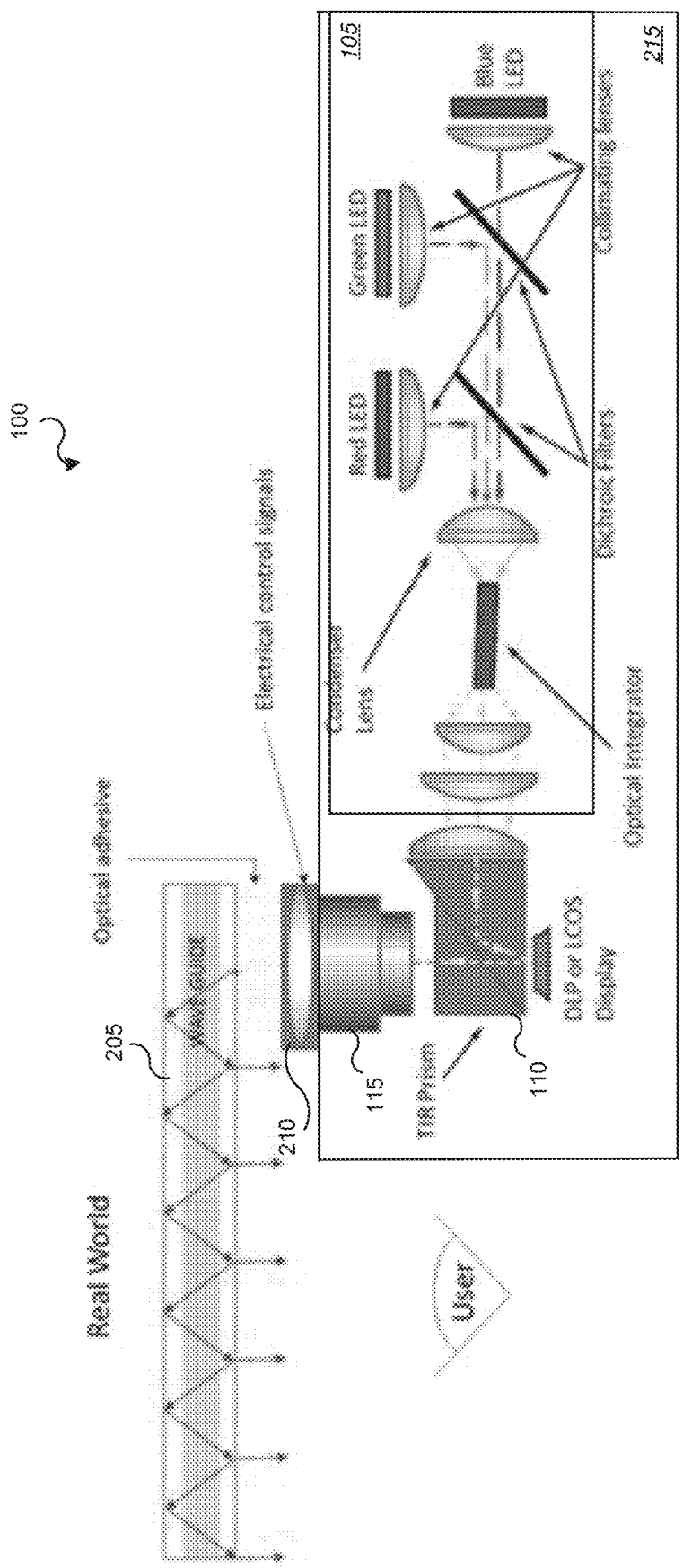
FIG. 4 is a diagram illustrating additional details of an optical waveguide imaging system providing a dynamically variable image focal length according to another embodiment of the present disclosure.

FIG. 4 is a diagram illustrating additional details of an optical waveguide imaging system providing a dynamically variable image focal length according to another embodiment of the present disclosure. As illustrated in this example, rather than adding an additional lens as shown in FIG. 2, this embodiment replaces the projection display engine 215 focusing lens 115 with a variable lens 210 described above. Regardless of whether the option is to replace the projection engine lens with the variable lens 210 as shown in FIG. 4 or add the variable lens 210 to the projection engine 215 as shown in FIG. 3, the variable lens 210 allows the lens controller 220 executing control software to tune the variable lens via an electrical signal to adjust the focal length and focal plane of the images projected through the waveguide display 205. In either case, the variable lens 210 can be implemented using controllable lens mechanisms including but not limited to a Voice Coil Motor (VCM), a piezo control system (e.g. 1Limited), a deformed or pumped liquid lens (e.g. Varioptics), liquid crystal materials (e.g. Lensvector), a membrane deflection material (e.g. Optotune), MicroElectroMechanical Systems (MEMS) lenses (e.g. DigitalOptics or WaveLens), or others.

Utilizing the variable lens 210 to control the focal plane of the images displayed through the waveguide display 205, other capabilities can be added to the system. For instance, and as noted above, a display device according to embodiments of the present disclosure can include an eye tracking system. As known in the art, such a system can monitor the user's eyes to determine a gaze, i.e., a position of the user's eyes or where on the displayed scene the user is focused at a particular moment. Based on eye tracking data and/or instructions from this system, the variable lens 210 can be controlled to dynamically change the focal plane in areas where the user is gazing. Specifically, if the user is looking at an area that is in the background, the focal plane can be changed to sharpen the background objects and blur the foreground objects and provide enhancement through techniques such as foveated rendering.

In another embodiment, the display device can include an IMU system. As known in the art, such a system can provide information and/or instructions based on the position and/or movement of the user's head while wearing the display device. Based on this feedback, the variable lens can be controlled to adjust both the focal plane and the level of zoom if a zoom lens has also been integrated with the variable lens structure described above. So, for example, if the user leans forward, the focal plane can be moved closer to the user thereby simulating the effect of when a user leans forward into a standard external PC monitor. In such implementations, the variable lens can comprise a separate controllable zoom element so that the variable lens can both enlarge the image and move the focal plane closer to the user. In this way the display device can more accurately mimic how the human visual system works with real world objects.

In cases in which the variable lens is implemented through technologies such as liquid lenses, a non-uniform force can be applied across the variable lens to control the curvature of the lens symmetrically or asymmetrically. Specifically, if the tunable lens has 3 or more control points, an uneven force can be applied across the lens control points allowing distortion or displacement correction. This uneven force can be applied to overcome tilt (pitch, yaw) alignment issues resulting from manufacturing or component tolerances from subassembly and final assembly integration. In this implementation, the force applied to various control locations around the deformable lens structure can be nonuniform and pre-distortion control characteristics can be pre-programmed into the lens control algorithm at the time of manufacture.

In yet another embodiment, the display device can include temperature sensors. In such cases, the controller can provide temperature compensation which frequently causes shift in optical performance as a factor in extended temperature range use. In this case, the optical system can be characterized over the full operating condition and correction curves can be maintained by the controller. These curves can be applied to the lens control function based on measured temperature and the variable lens can be controlled to adjust for temperature-induced shifts.

Figure 5:
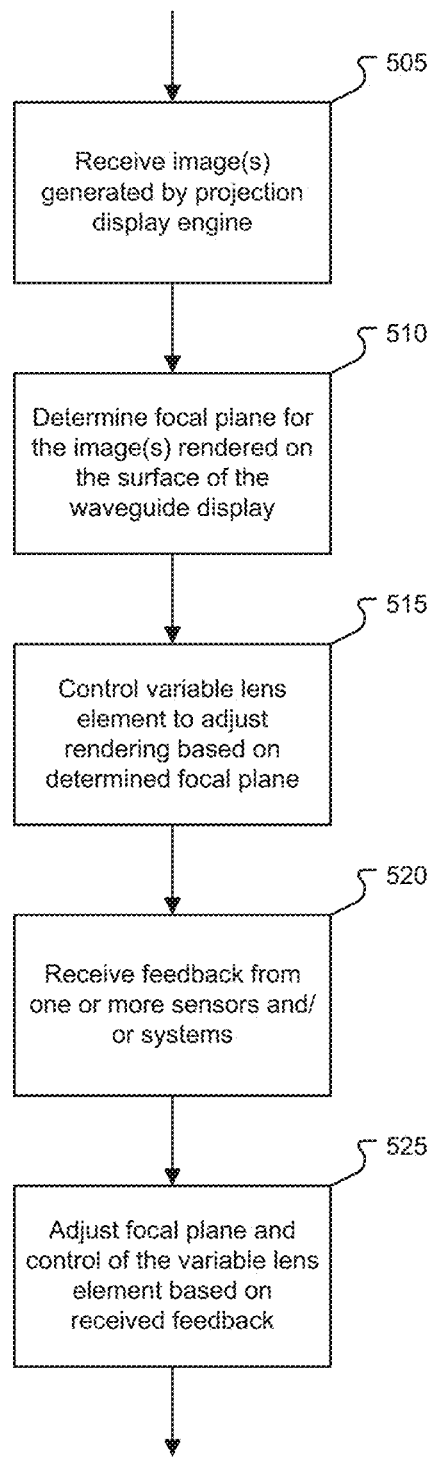
FIG. 5 is a flowchart illustrating an exemplary process for controlling an optical waveguide imaging system to provide a dynamically variable image focal length according to one embodiment of the present disclosure.

FIG. 5 is a flowchart illustrating an exemplary process for controlling an optical waveguide imaging system to provide a dynamically variable image focal length according to one embodiment of the present disclosure. As illustrated in this example, controlling a display device can comprise receiving 505 one or more images generated by a projection display engine of the display device and rendered by a waveguide display element of the display device on a surface of the waveguide display element visible to a user of the display device. A focal plane for the images rendered on the surface of the waveguide display element visible to the user of the display device can be determined 510 based at least in part on content of the received one or more images. A variable lens element of the display device can be controlled 515 based on the determined 510 focal plane. The variable lens element can be disposed between the projection display device and the waveguide display element and the variable lens element can adjust rendering of the images on the surface of the waveguide display element visible to the user of the display device based on the determined focal plane.

For example, controlling 515 the variable lens can comprise adjusting the lens based on a focal length for particular content being displayed and/or adjusting the focal length based on a manual input. In some cases, the variable lens element can additionally or alternatively comprise a deformable lens having three or more control locations. In such cases, controlling 515 the variable lens element can further comprise maintaining a predefined set of control parameters, and causing the variable lens element to apply a nonuniform force to the deformable lens through the three or more control locations based on the set of control parameters causing the deformable lens to compensate for assembly pitch and yaw misalignments of the variable lens element.

Controlling a display device can further comprise receiving 520 feedback from one or more sensors or systems and adjusting the determined 510 focal plane and control 515 of the variable lens based on the received 515 feedback. For example, the display device can comprise an eye tracking system. In such cases, controlling the variable lens element can further comprise receiving 520 eye tracking data or instructions from the eye tracking system and adjusting 525 the focal plane of the images rendered on the surface of the waveguide display element visible to the user based on the received eye tracking data or instructions.

Additionally or alternatively, the display device can further comprise an Inertial Measurement Unit (IMU). In such cases, controlling the variable lens element can further comprise receiving 520 information or instructions from the IMU indicating a movement of the user and controlling 525 the variable lens element to adjust a level of zoom and the focal plane of the images rendered on the surface of the waveguide display element visible to the user based on the received information or instructions from the IMU indicating a movement of the user.

Additionally, or alternatively, the display device can further comprise one or more temperature sensors and the electronic control unit can maintain a predefined set of temperature correction curves for one or more of the projection display engine, variable lens element, or waveguide display element over a range of operating conditions. In such cases, controlling the variable lens element can further comprise receiving 520 electronic input from the one or more temperature sensors and applying one or more temperature correction curves of set of temperature correction curves to a lens control function, the lens control function adjusting 525 the variable lens element and compensating for a temperature indicated by the received electronic input from the one or more temperature sensors based on the applied one or more temperature correction curves.

Figure 6:
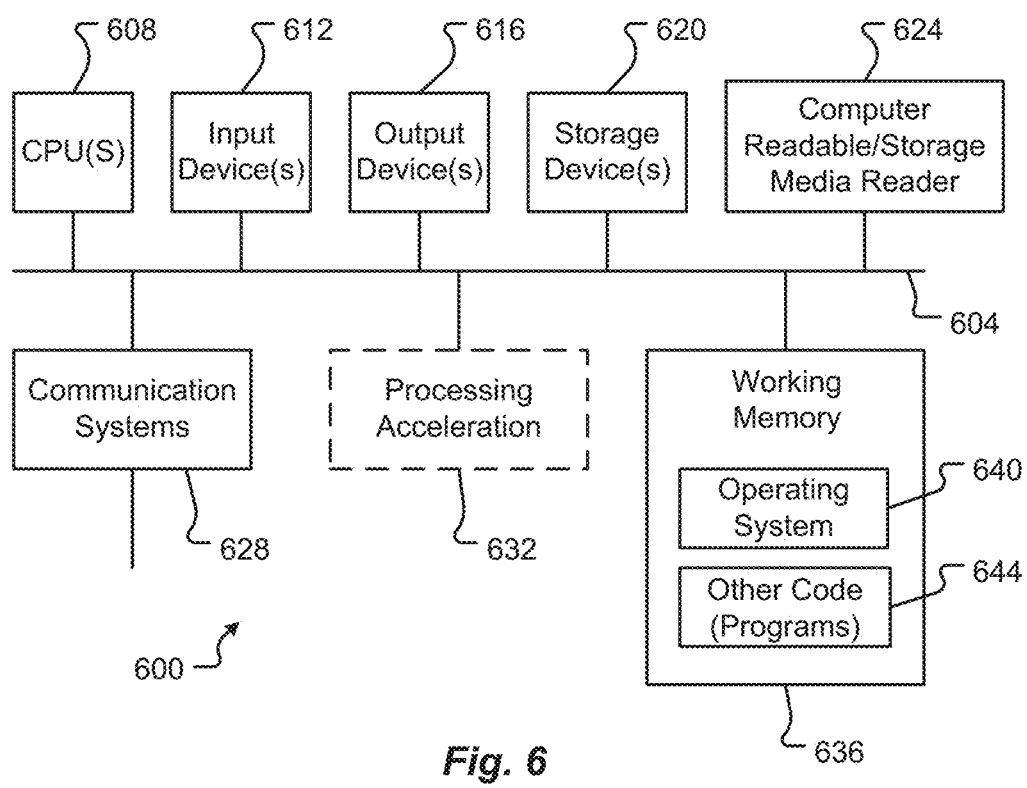
FIG. 6 is a block diagram illustrating elements of an exemplary computing device in which embodiments of the present disclosure may be implemented.

FIG. 6 is a block diagram illustrating elements of an exemplary computing device in which embodiments of the present disclosure may be implemented. More specifically, this example illustrates one embodiment of a computer system 600 upon which the servers, user computers, computing devices, or other systems or components described above may be deployed or executed. The computer system 600 is shown comprising hardware elements that may be electrically coupled via a bus 604. The hardware elements may include one or more central processing units (CPUs) 608; one or more input devices 612 (e.g., a mouse, a keyboard, etc.); and one or more output devices 616 (e.g., a display device, a printer, etc.). The computer system 600 may also include one or more storage devices 620. By way of example, storage device(s) 620 may be disk drives, optical storage devices, solid-state storage devices such as a random-access memory ("RAM") and/or a read-only memory ("ROM"), which can be programmable, flash-updateable and/or the like.

The computer system 600 may additionally include a computer-readable storage media reader 624; a communications system 628 (e.g., a modem, a network card (wireless or wired), an infra-red communication device, etc.); and working memory 636, which may include RAM and ROM devices as described above. The computer system 600 may also include a processing acceleration unit 632, which can include a DSP, a special-purpose processor, and/or the like.

The computer-readable storage media reader 624 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 628 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 600 may also comprise software elements, shown as being currently located within a working memory 636, including an operating system 640 and/or other code 644. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 608 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A display device comprising:
a projection display engine generating images;
a waveguide display element receiving the generated images from the projection display engine and rendering the received generated images on a surface of the waveguide display element visible to a user of the display device;
a variable lens element disposed between the waveguide display element and the projection display engine, the variable lens element adapted to adjust a focal plane of the received generated images rendered on the surface of the waveguide display element visible to the user;

an electronic control unit electronically coupled with the variable lens element and adapted to control adjustment of the focal plane of the received generated images rendered on the surface of the waveguide display element visible to the user, wherein adjustment of the focal plane of the received generated images rendered on the surface of the waveguide display element visible to the user comprises a static diopter adjustment based on a user input and a dynamic adjustment based on a current content of the received generated images rendered on the surface of the waveguide display element visible to the user; and an Inertial Measurement Unit (IMU) coupled with the electronic control unit, the IMU detecting a movement of the user and providing to the electronic control unit information or instructions indicating the detected movement of the user and wherein the electronic control unit controls the variable lens element to adjust the focal plane of the received generated images and a zoom element to adjust a level of zoom applied to the received generated images rendered on the surface of the waveguide display element visible to the user based on the information or instructions from the IMU.

2. The display device of claim 1, wherein the waveguide display element comprises a stereoscopic display and wherein the variable lens element independently adjusts the focal plane of images rendered for each eye of the user.

3. The display device of claim 1, further comprising a projection display engine focusing lens disposed adjacent to the projection display engine and wherein the variable lens element is disposed between the waveguide display element and the projection display engine focusing lens.

4. The display device of claim 1, wherein the variable lens element is disposed adjacent to both the waveguide display element and the projection display engine.

5. The display device of claim 1, further comprising an eye tracking system and wherein the electronic control unit receives eye tracking data or instructions from the eye tracking system and controls the variable lens element to adjust the focal plane of the received generated images rendered on the surface of the waveguide display element visible to the user based on the received eye tracking data or instructions.

6. The display device of claim 1, wherein the movement of the user comprises the user leaning forward and wherein controlling the variable lens element to adjust the level of zoom comprises controlling the variable lens element to increase the level of zoom.

7. The display device of claim 1, wherein the variable lens element comprises a deformable lens having three or more control locations, wherein the electronic control unit maintains a predefined set of control parameters, and wherein the electronic control unit causes the variable lens element to apply a nonuniform force to the deformable lens through the three or more control locations based on the predefined set of control parameters causing the deformable lens to compensate for assembly pitch and yaw misalignments of the variable lens element.

8. The display device of claim 1, further comprising one or more temperature sensors, wherein the electronic control unit maintains a predefined set of temperature correction curves for one or more of the projection display engine, variable lens element, or waveguide display element over a range of operating conditions, wherein the electronic control unit receives electronic input from the one or more temperature sensors and applies one or more temperature correction curves of set of temperature correction curves to a lens control function, the lens control function adjusting the variable lens element and compensating for a temperature indicated by the received electronic input from the one or more temperature sensors based on the applied one or more temperature correction curves.

9. A control system of a display device, the control system comprising:

a processor; and a memory coupled with and readable by the processor and storing therein a set of instructions which, when executed by the processor, causes the processor to control a variable lens element of the display device disposed between a waveguide display element of the display device and a projection display engine of the display device, wherein the processor of the control system controls the variable lens element by:

receiving one or more images generated by the projection display engine and rendered by the waveguide display element on a surface of the waveguide display element visible to a user of the display device;

determining a focal plane for the received one or more images rendered on the surface of the waveguide display element visible to the user of the display device based at least in part on content of the received one or more images;

controlling the variable lens element to adjust rendering of the images on the surface of the waveguide display element visible to the user of the display device based on the determined focal plane, wherein adjusting rendering of the received one or more images comprises a static diopter adjustment based on a user input and a dynamic adjustment based on a current content of the received one or more the images rendered on the surface of the waveguide display element visible to the user;

receiving information or instructions from an Inertial Measurement Unit (IMU) of the display device, the information or instructions indicating a movement of the user detected by the IMU; and controlling the variable lens element to adjust the focal plane of the received one or more images and a zoom element to adjust a level of zoom applied to the received one or more images rendered on the surface of the waveguide display element visible to the user based on the received information or instructions from the IMU.

10. The control system of claim 9, wherein the display device further comprises an eye tracking system and wherein controlling the variable lens element further comprises:

receiving eye tracking data or instructions from the eye tracking system; and adjusting the focal plane of the received one or more images rendered on the surface of the waveguide display element visible to the user based on the received eye tracking data or instructions.

11. The control system of claim 9, wherein the movement of the user comprises the user leaning forward and wherein controlling the variable lens element to adjust the level of zoom comprises controlling the variable lens element to increase the level of zoom.

12. The control system of claim 9, wherein the variable lens element comprises a deformable lens having three or more control locations, wherein the control system maintains a predefined set of control parameters, and wherein the control system causes the variable lens element to apply a nonuniform force to the deformable lens through the three or more control locations based on the predefined set of control parameters causing the deformable lens to compensate for assembly pitch and yaw misalignments of the variable lens element.

13. The control system of claim 9, wherein the display device further comprises one or more temperature sensors, wherein the control system maintains a predefined set of temperature correction curves for one or more of the projection display engine, variable lens element, or waveguide display element over a range of operating conditions, and wherein controlling the variable lens element further comprises:
   receiving electronic input from the one or more temperature sensors; and
   applying one or more temperature correction curves of set of temperature correction curves to a lens control function, the lens control function adjusting the variable lens element and compensating for a temperature indicated by the received electronic input from the one or more temperature sensors based on the applied one or more temperature correction curves.

14. A method for controlling a display device, the method comprising:
   receiving, by a control unit of the display device, one or more images generated by a projection display engine of the display device and rendered by a waveguide display element of the display device on a surface of the waveguide display element visible to a user of the display device;
   determining, by the control unit of the display device, a focal plane for the received one or more images rendered on the surface of the waveguide display element visible to the user of the display device based at least in part on content of the received one or more images;
   controlling, by the control unit of the display device, a variable lens element of the display device, the variable lens element disposed between the projection display engine and the waveguide display element and wherein the variable lens element adjusts rendering of the received one or more images on the surface of the waveguide display element visible to the user of the display device based on the determined focal plane, wherein adjusting rendering of the received one or more images comprises a static diopter adjustment based on a user input and a dynamic adjustment based on a current content of the received one or more images rendered on the surface of the waveguide display element visible to the user;
   receiving, by the control unit of the display device, information or instructions from an Inertial Measurement Unit (IMU) of the display device, the information or instructions indicating a movement of the user detected by the IMU; and
   controlling, by the control unit of the display device, the variable lens element to adjust the focal plane of the received one or more images and a zoom element to adjust a level of zoom applied to the received one or more images rendered on the surface of the waveguide display element visible to the user based on the received information or instructions from the IMU.

15. The method of claim 14, wherein the display device further comprises an eye tracking system and wherein controlling the variable lens element further comprises:
   receiving eye tracking data or instructions from the eye tracking system; and
   adjusting the focal plane of the received one or more images rendered on the surface of the waveguide display element visible to the user based on the received eye tracking data or instructions.

16. The method of claim 14, wherein the movement of the user comprises the user leaning forward and wherein controlling the variable lens element to adjust the level of zoom comprises controlling the variable lens element to increase the level of zoom.

17. The method of claim 14, wherein the variable lens element comprises a deformable lens having three or more control locations, wherein the control unit maintains a predefined set of control parameters, and wherein the control unit causes the variable lens element to apply a nonuniform force to the deformable lens through the three or more control locations based on the predefined set of control parameters causing the deformable lens to compensate for assembly pitch and yaw misalignments of the variable lens element.

18. The method of claim 14, wherein the display device further comprises one or more temperature sensors, wherein the control unit maintains a predefined set of temperature correction curves for one or more of the projection display engine, variable lens element, or waveguide display element over a range of operating conditions, and wherein controlling the variable lens element further comprises:
   receiving electronic input from the one or more temperature sensors; and
   applying one or more temperature correction curves of set of temperature correction curves to a lens control function, the lens control function adjusting the variable lens element and compensating for a temperature indicated by the received electronic input from the one or more temperature sensors based on the applied one or more temperature correction curves.

* * * * *